United States Patent [19]
Browning

[11] Patent Number: 6,131,380
[45] Date of Patent: Oct. 17, 2000

[54] FLOATING DECK MOWER WITH GRAVITY ACTUATED BRAKE

[76] Inventor: Albert Browning, 179 Hwy. 865, Winnsboro, La. 71295-5122

[21] Appl. No.: 09/206,261

[22] Filed: Nov. 27, 1998

[51] Int. Cl.[7] .......................... A01D 34/03; A01D 34/43; A01D 34/63
[52] U.S. Cl. ............................ 56/16.7; 56/15.7; 56/15.8; 56/14.7; 56/DIG. 10
[58] Field of Search ..................... 56/15.8, 14.7, 56/15.7, 15.9, 16.7, DIG. 3, DIG. 10, DIG. 22; 180/6.48, 6.66

[56] References Cited

U.S. PATENT DOCUMENTS

| | | |
|---|---|---|
| 1,043,507 | 11/1912 | Coldwell . |
| 2,523,166 | 9/1950 | Tom . |
| 2,614,473 | 10/1952 | Yocoby et al. . |
| 2,859,578 | 11/1958 | Hall . |
| 3,263,406 | 8/1966 | Hanson et al. . |
| 3,668,845 | 6/1972 | Parker . |
| 3,702,051 | 11/1972 | Deines . |
| 4,159,613 | 7/1979 | Knudson et al. . |
| 4,227,364 | 10/1980 | Scherbring . |
| 4,266,617 | 5/1981 | Mullet et al. . |
| 4,313,295 | 2/1982 | Hansen et al. . |
| 4,325,210 | 4/1982 | Marto . |
| 4,787,646 | 11/1988 | Kamlukin et al. ..................... 280/95 R |
| 4,809,489 | 3/1989 | Johansson ................................. 56/14.7 |
| 4,869,057 | 9/1989 | Siegrist .................................... 56/15.9 |
| 4,914,898 | 4/1990 | Jenkins . |
| 4,930,296 | 6/1990 | Takei et al. . |
| 5,012,632 | 5/1991 | Kuhn et al. ............................. 56/11.6 |
| 5,177,942 | 1/1993 | Hager et al. . |
| 5,201,240 | 4/1993 | Hayes et al. ............................. 74/512 |
| 5,249,411 | 10/1993 | Hake . |
| 5,367,864 | 11/1994 | Ogasawara et al. ..................... 56/15.8 |
| 5,390,479 | 2/1995 | Hutchison et al. ...................... 56/11.3 |
| 5,507,138 | 4/1996 | Wright et al. ............................ 56/14.7 |
| 5,600,944 | 2/1997 | Wright et al. ............................ 56/14.7 |
| 5,758,478 | 6/1998 | Bando et al. ............................. 56/15.2 |
| 5,765,347 | 6/1998 | Wright et al. ............................ 56/14.7 |
| 5,809,755 | 9/1998 | Velke et al. ............................. 56/10.8 |
| 5,873,224 | 2/1999 | Murakawa et al. ...................... 56/11.4 |
| 5,964,082 | 10/1999 | Wright et al. ............................ 56/14.7 |
| 5,984,031 | 11/1999 | Velke et al. ............................. 180/6.48 |

*Primary Examiner*—Thomas B. Will
*Assistant Examiner*—Arpad Fabian Kovacs
*Attorney, Agent, or Firm*—Robert Veal; Robert Jackson; Burr & Forman, LLP

[57] ABSTRACT

A power-driven lawnmower having a main chassis supporting an operator, a pair of forward drive wheels, and a steering wheel utilizes a floating mower deck which covers or houses at least one driven mower blade. The deck is connected to the main chassis by a pair of arms terminating in ball joints affixed to the mower deck which is supported on ground engaging wheels such that the mower deck follows the contour of the ground. A flexible drive belt is connected to a constant power take off element on the main chassis and to the drive mechanism on the deck such that belt is entrained over a constant distance due to the connection of the arms to the chassis and the mower deck. A zero turning radius rear steering mechanism is operatively connected to the steering wheel and to a mechanism for disengaging one of a pair of forward drive wheels from motive power from the engine during a turn, thereby enabling the maneuverability of the machine, and a foot operated reversing mechanism is provided which can readily be engaged to reverse the direction of travel of a power-driven lawnmower. For safety concerns the mower is equipped with a gravity actuated brake which stops movement of the mower and the blade when the gas pedal is released. When the gas pedal is pressed again the vehicle moves forward again with the mower running again. Vehicle remains stopped if foot pedal is pressed into neutral position. Mower runs full rpm's when gas pedal is depressed allowing shuttle action in trimming forward or rearward by command of clutch pedal operated by left foot. Mower is disengaged by a hand-operated lever on left side.

16 Claims, 8 Drawing Sheets

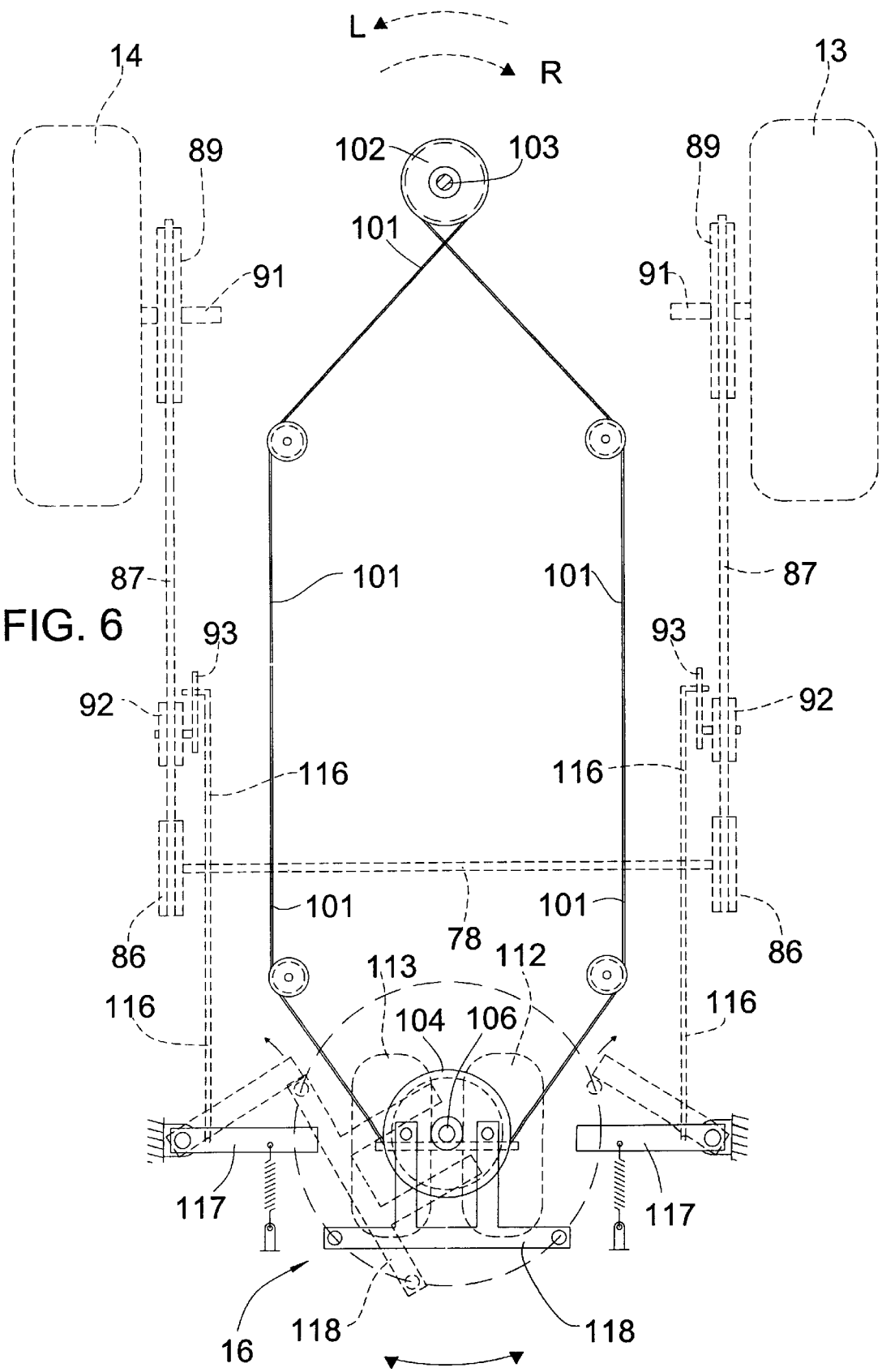

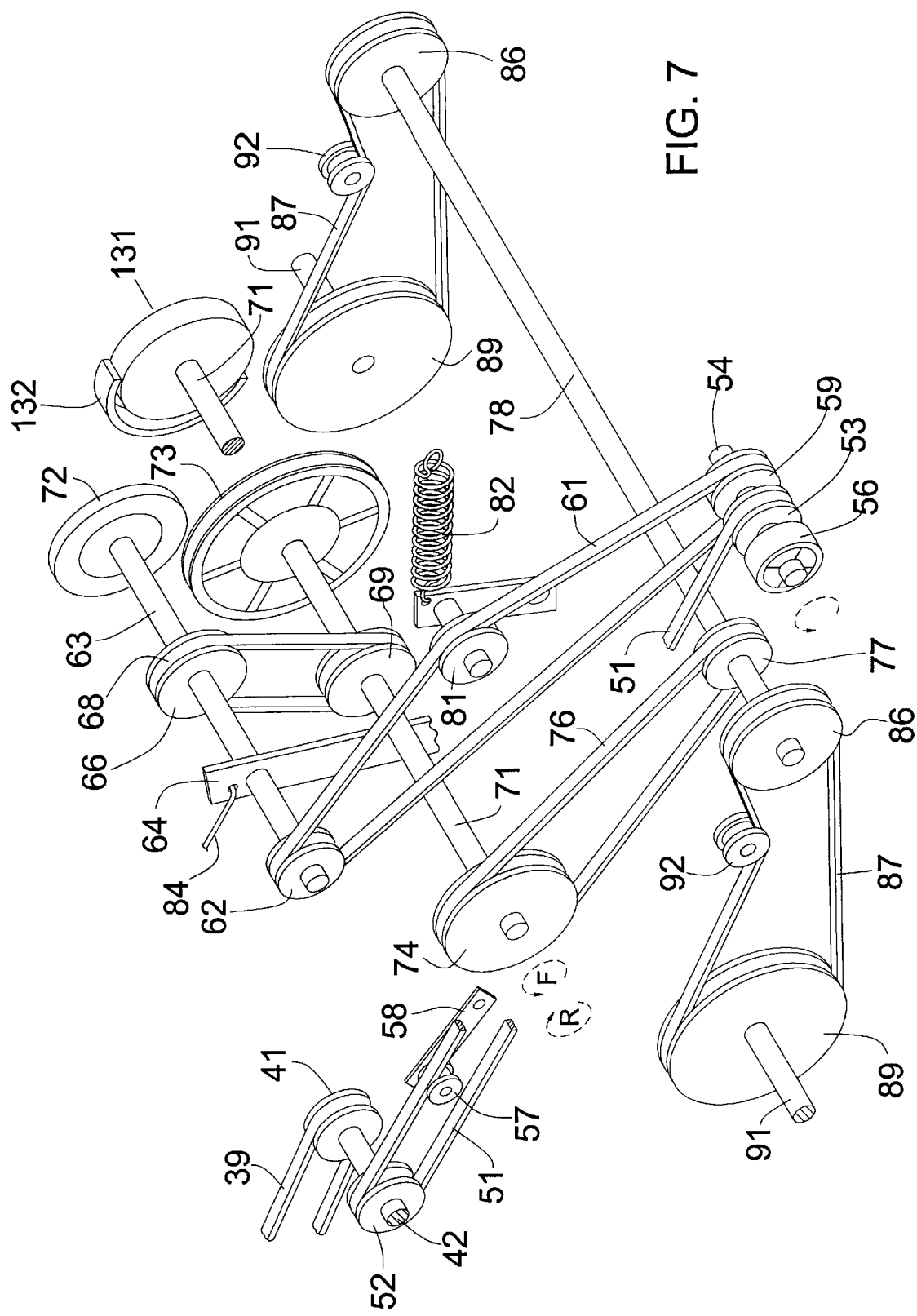

FLOATING DECK MOWER WITH GRAVITY ACTUATED BRAKE

FIELD OF THE INVENTION

The present invention relates to power-driven lawnmowers and in particular to power-driven lawnmowers whereupon the operator rides atop the mower and controls the direction of the mower using a steering wheel. In even greater particularity the present invention relates to a lawnmower having a floating deck detachably affixed to the front of the mower which can follow the contour of the surface more efficiently. In still further particularity the present invention may be said to be a riding lawnmower having a minimal turn radius, and a detachable forwardly mounted floating deck having a shape which allows efficient trimming around shrubs.

BACKGROUND OF THE INVENTION

From as early as 1912, the motor operated lawnmower has been an evolutionary device. Mr. W. H. Coldwell in his U.S. Pat. No. 1,043,507 disclosed a tricycle type mower having a rear steerable wheel and a forwardly mounted mower. Since that time numerous improvements have been made to the motor operated lawnmower, yet still, the need exists for improved mower designs. Improvement in maneuverability, contour following without power loss, simplicity of maintenance, and efficiency of machine use is still possible and needed.

SUMMARY OF THE INVENTION

It is the object of the present invention to provide a readily maneuverable power-driven riding lawnmower. Yet another object of the invention is to provide a lawnmower which has a superior floating deck wherein the drive to the deck is not affected by the attitude of the deck. Yet another object of the invention is to provide a lawnmower which is easily serviceable and which is safe to operate. Still another object of the invention is to provide a maneuverable lawnmower which is easily controlled. These and other features and advantages of my lawnmower are accomplished in the unique and novel combination of elements in a power-driven lawnmower having a main chassis supporting an operator, a pair of forward drive wheels, and a steering wheel. The chassis is adaptable for various size mowers and is configured to receive a floating mower deck which covers or houses at least one driven mower blade. The deck is connected to said main chassis by a pair of arms terminating in ball joints affixed to said mower deck which is supported on ground engaging wheels such that the mower deck follows the contour of the ground. A flexible drive belt is connected to a constant power take off element on the main chassis and to the drive mechanism on the deck such that belt is entrained over a constant distance due to the connection of the arms to the chassis and the mower deck.

A zero turning radius rear steering mechanism is operatively connected to steering wheel and to a mechanism for disengaging one of a pair of forward drive wheels from motive power from the engine during a turn, thereby enabling the maneuverability of the machine, and a foot operated reversing mechanism is provided which can readily be engaged to reverse the direction of travel of power-driven lawnmower. For safety concerns the mower is equipped with a gravity actuated brake which stops movement of the mower and the blade, when foot operated gas pedal is released.

BRIEF DESCRIPTION OF THE DRAWINGS

Apparatus embodying features of my invention are depicted in the accompanying drawings which form a portion of this disclosure and wherein:

FIG. 6 is a plan view of one embodiment of the drive disengagement linkage;

FIG. 7 is perspective view of one embodiment of the drive system;

DESCRIPTION OF THE PREFERRED EMBODIMENT

Figure 1:
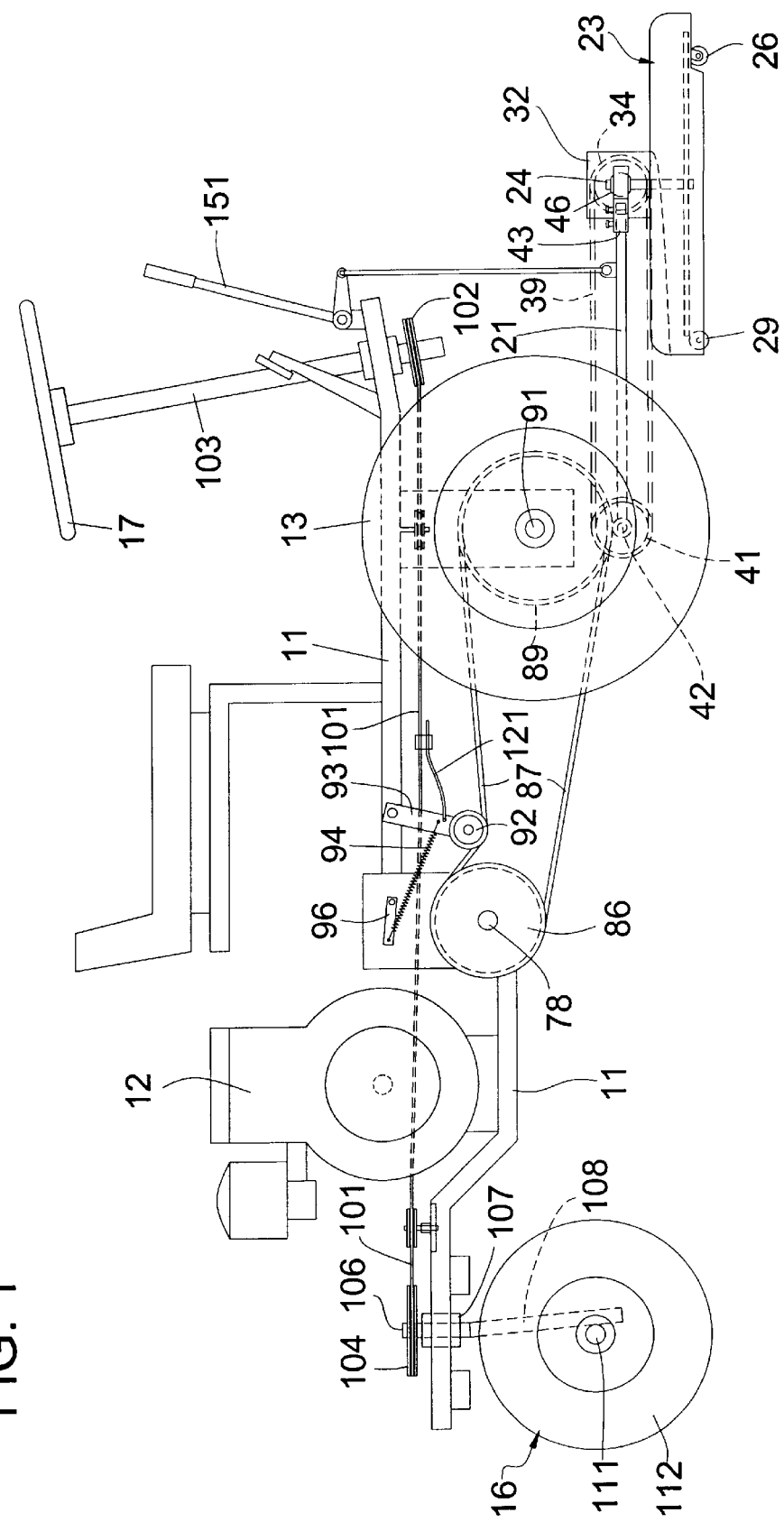
FIG. 1 is a side elevational view of a mower showing the general arrangement of the components of the mower system.

Referring to the drawings for a clearer understanding of the invention, it may be seen in FIG. 1 that the apparatus includes a main chassis 11 which supports an engine 12, a driver seat, and the associated drive mechanisms. It is to be understood that the aesthetic qualities of the apparatus are not depicted herein inasmuch as the housing and seat arrangement may vary in accordance with taste, fashion and choice. Likewise, no particular detail is provided herein regarding the exact dimensions of the chassis inasmuch as the prototype chassis was configured such that at least three different size mowing machines could be built on a standard chassis.

Figure 2:
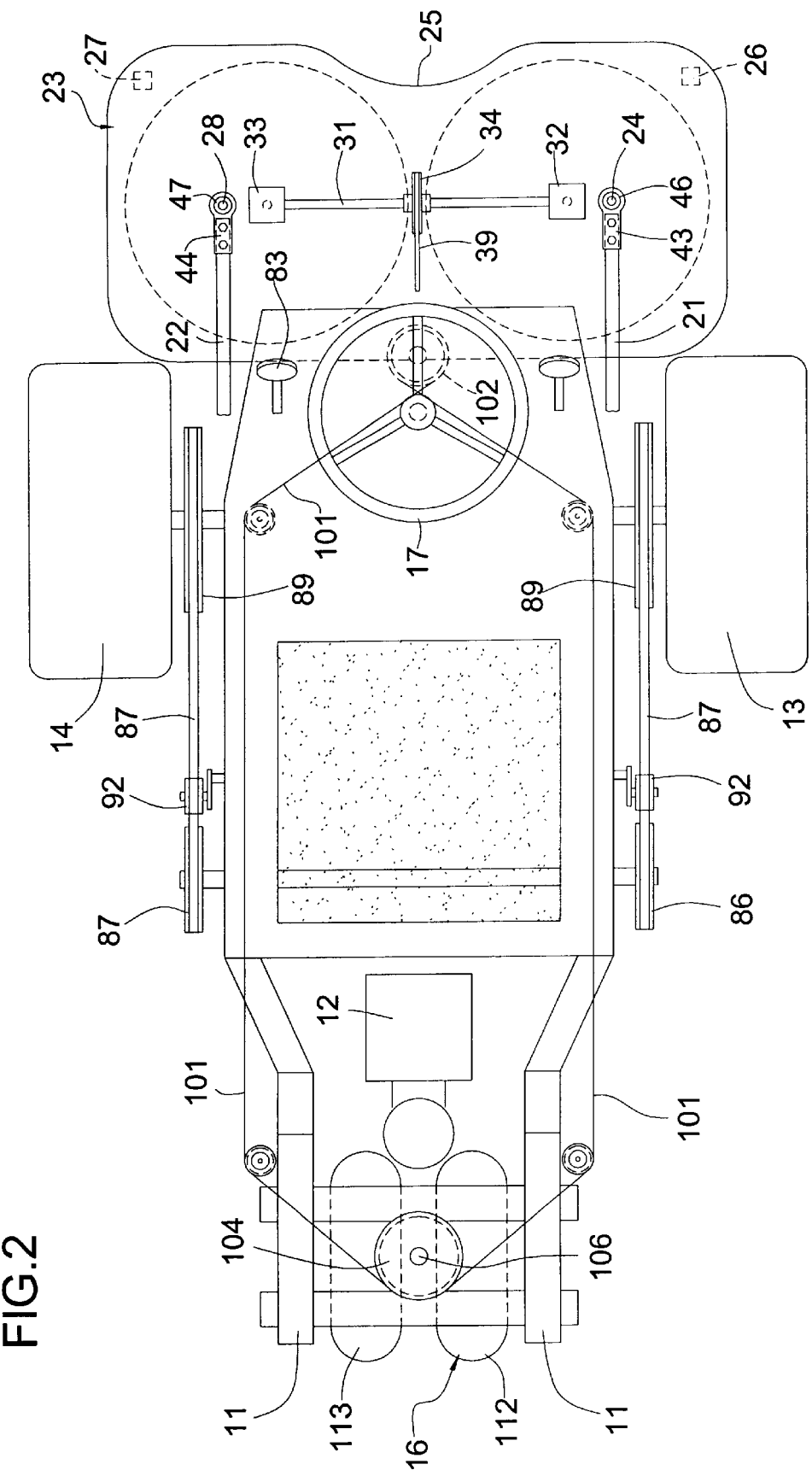
FIG. 2 is a plan view of one embodiment of the invention showing the general arrangement of the components of the system.

As may be seen, in FIGS. 1 and 2 chassis 11 is supported on a pair of forward drive wheels 13 and 14 and a rear caster assembly 16. The weight of the chassis, engine and operator are all appropriately centered rear of the drive wheels 13, 14 for safety. The operator utilizes a common steering wheel 17 for controlling the deviation of the course of the machine while operating the same. As will be explained more fully hereinafter, one of the novel features of the invention resides in the realization of the zero radius turning capability of the mower. Extending forwardly from the chassis 11 are a pair of arms 21 and 22 which connect a mower deck 23 to the chassis. The mower deck 23 is attached and designed such that it can "float" or follow the contour of the ground. To accomplish this floating action without losing drive power to mower deck 23, the following structure is employed. Deck 23 is supported from beneath by corner casters 26, 27, and 29 at the front corners and rear center of the deck and is shrouded on both sides such that it is a rear discharge type deck. Mounted atop the deck is a transverse blade drive shaft 31 terminating in gearboxes 32 and 33 and having a blade drive pulley 34 centrally mounted thereon for concomitant rotation with blade drive shaft 31. Gearboxes 32, 33 transmit rotational force to associated spindle shafts, not shown to which a pair of blades are mounted for rotation in a conventional manner. Entrained about blade drive pulley 34 is a flexible drive belt 39 which is also entrained about a power take off pulley 41 mounted on a power take off shaft 42 rotatably supported on chassis 11. Arms 21 and 22 are connected to chassis 11 on pivot pins and extend outwardly to terminal shoes 43 and 44 which can be adjusted to lengthen arms 21 and 22. Shoes 43, 44 each have mounted therein a ball and socket 46, 47 which receive an upstanding pin 24, 28 mounted to deck 23 such that deck 23 is free to articulate on the casters 26, 27 and 29 while maintaining the separation between power take off pulley 41 and blade drive pulley 34 at a constant distance such that flexible belt 39 is never overtensioned, slack or subjected to undue side loading. In this manner belt life and mower deck efficiency are both improved. Power take off shaft 42 is connected to engine 12 by a power take off belt 51 entrained about a driver pulley 52 affixed to power take off shaft 42 for concomitant rotation therewith and entrained about a sheave 53 mounted on an output shaft 54 of engine 12. A clutch mechanism 56 conventionally isolates the engine 12 from output shaft 54 to avoid shock damage and to enable braking action as hereinafter described. An idler pulley 57 mounted on a lever actuator 58 for movement to a selected position tensioning belt 51 on pulley 52 and sheave 53 and to a slack position displaced from belt 51 is engagable by the operator to send power to the blades from the engine.

It will be appreciated that the mower deck 23 may be disengaged from shoes 43, 44 and an alternative accessory may be attached thereto. If the accessory, such as a seed or fertilizer spreader requires power, the flexible belt may be used in the same manner. If the accessory is a pallet or other type carrying apparatus, it may be raised and lowered with a lever 151, which is connected to raise the arms 43, 44 in a conventional manner.

Figure 8:
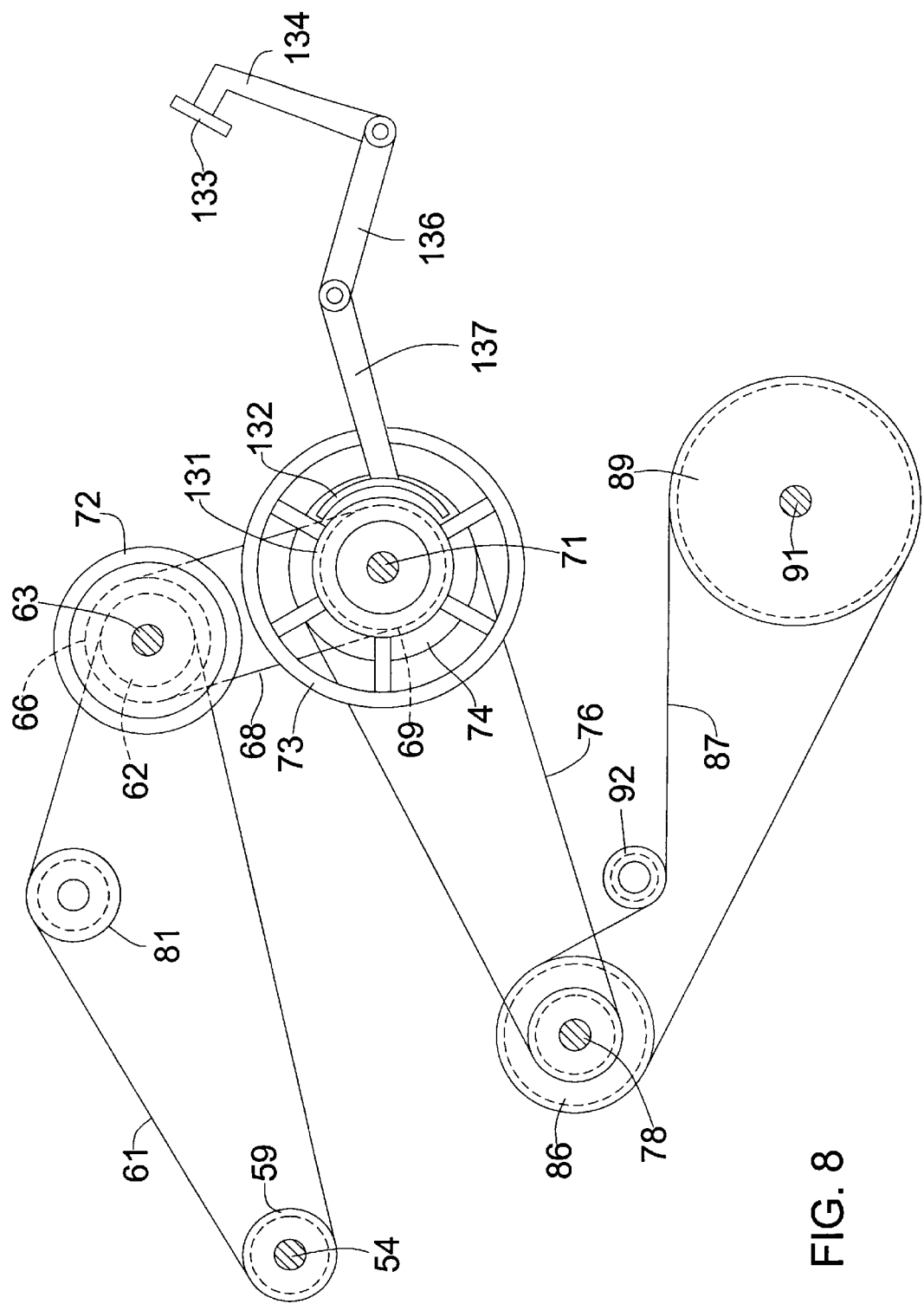
FIG. 8 is a side elevational schematic of the gravity actuated brake system.

Referring to FIG. 8, it may be seen that output shaft 54 has a second output sheave 59 thereon which provides motive force to the lawnmower. A mower drive belt 61 is engaged with sheave 59 and is entrained about a first pulley 62 affixed to an auxiliary shaft 63 which is supported on a cantilever frame 64 moveable transverse to auxiliary shaft 63 about an axis parallel to output shaft 54 and auxiliary shaft 63. A second pulley 66 is affixed to auxiliary shaft 63 and has an auxiliary belt 68 entrained thereon. Auxiliary belt 68 is also entrained around a forward pulley 69 affixed for concomitant rotation to a directional drive shaft 71. Also mounted to auxiliary shaft 63 for concomitant rotation therewith is a rubber coated reversing wheel 72. Directional drive shaft 71 has mounted thereon a grooved star wheel 73, positioned in the same plane as wheel 72, and a transfer pulley 74 which is constantly engaged by transfer belt 76 which is engaged in a cross shaft drive pulley 77 mounted on cross shaft 78 extending transversely across chassis 11. It will be understood that pulleys 74 and 77 may be replaced by sprockets and transfer belt 76 may be replaced by a chain.

Figure 10:
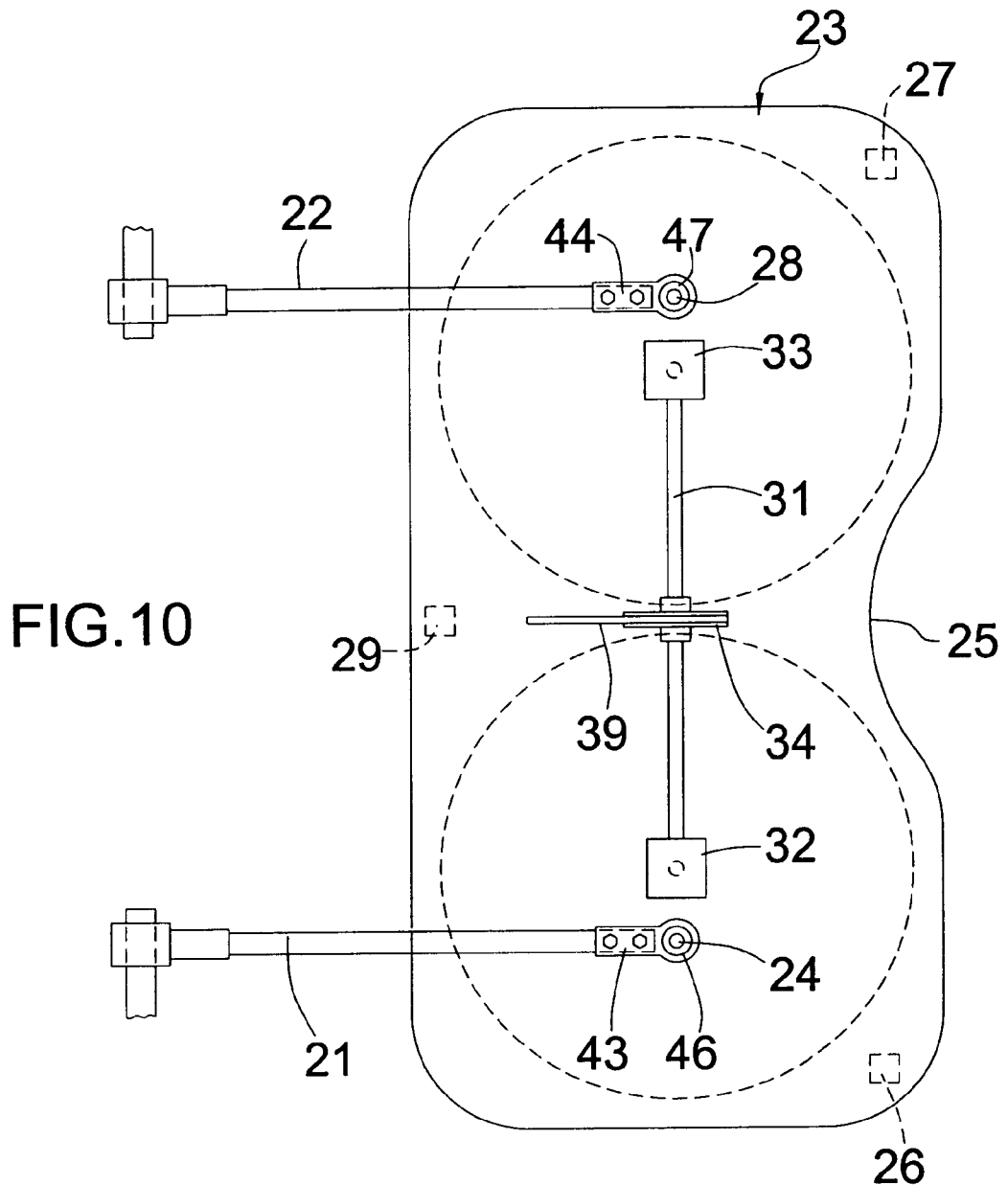
FIG. 10 is a plan view of the mower deck.

A reverse control idler 81 is constantly engaged with mower drive belt 61 but is movably supported and biased by a tensioning spring 82 affixed to chassis 11 such that movement of frame 64 varies the separation between auxiliary shaft 63 and directional drive shaft 71 without disengaging auxiliary shaft 63 from mower drive belt 61. Frame 64 is connected by a control cable 84 to a pedal 83 at the operator's foot such that pressure on the pedal 83 moves the frame to disengage the auxiliary shaft from its normally biased position which allows the mower to move forward, thus placing the mower in a "neutral" motion state. That is to say auxiliary belt 68 is made slack and cannot transfer power although auxiliary shaft 63 is still turning. Further movement of pedal 83 and frame 64 brings rubber coated wheel 72 into engagement with grooved wheel 73, thereby reversing the direction of rotation of directional drive shaft 71 and all components driven by it. Directional drive shaft 71 also has mounted thereon for concomitant rotation a sheave which acts as a brake drum 131 as shown in FIG. 8. Brake drum 131 is engagable by a brake shoe 132 having a surface adapted for engagement with a peripheral surface of brake drum to prevent rotation thereof. As will be appreciated when directional drive shaft 71 is arrested by the action of brake drum 131 and the associated shoe 132, the wheels 13 and 14 are arrested; however, the mower blade can continue to turn if the pedal 83 is in the neutral position. Brake shoe 132 is connected via a linkage to a pedal 133 which is formed on a brake lever mounted for pivotal motion about an axis parallel to said directional drive shaft 71 and having a portion 134 extending upwardly to define pedal 133. The other end 136 of the brake lever extends outwardly and rearwardly toward drum 131 to support a shoe link 137 pivotally supporting shoe 132 and such that the center of gravity of said lever with said link and attached brake shoe is between the parallel axis and said brake drum. Accordingly, when pedal 133 is depressed shoe 132 is lifted from the brake drum and motive force can be transferred to the drive wheels. Releasing pedal 133 causes the shoe link and shoe to fall by gravity to a brake engaging position in which the directional drive shaft 71 is held arrested from rotation in either direction by the overcenter condition of the shoe. As may be seen, the mower blade can continue to turn despite the brake if the forward/reverse pedal 83 is in the neutral position. This makes the mower extremely effective in trimming close areas. Referring to FIG. 10 it can be seen that the front of deck 23 is scalloped at 25 between the mower blades such that the housing may be placed immediately adjacent shrubs and trees to trim beneath such shrubs and closely against the trees.

Cross shaft 78 serves to drive both wheels 13 and 14 via a wheel drive pulley 86 associated with each wheel 13, 14 and mounted on the ends of cross shaft 78, about which a wheel belt 87 is entrained. Each wheel belt 87 a wheel pulley 89 mounted on a stub shaft 91 rotabably mounted on chassis 11 and connected to a wheel 13 or 14 for concomitant motion therewith. A wheel idler pulley 92 is pivotally mounted to chassis 11 for selective movement to a wheel belt tensioning position and a wheel belt slack position. More particularly, pulley 92 is mounted on a rigid arm 93, pivotally connected to chassis 11 for movement in the plane of wheel belt 87, such that in the tensioning position pulley 92 exerts a downward displacement on belt 87. A biasing spring 94 is connected at one end to arm 93 and at a second end to an extension lever 96 which is displaceable to a tensioned and untensioned position, such that pulley 92 is held under spring tension against the belt in the tensioned position or is merely resting on the belt in the untensioned position such that the associated wheel is free to turn without the resistance of the drive train.

Figure 5:
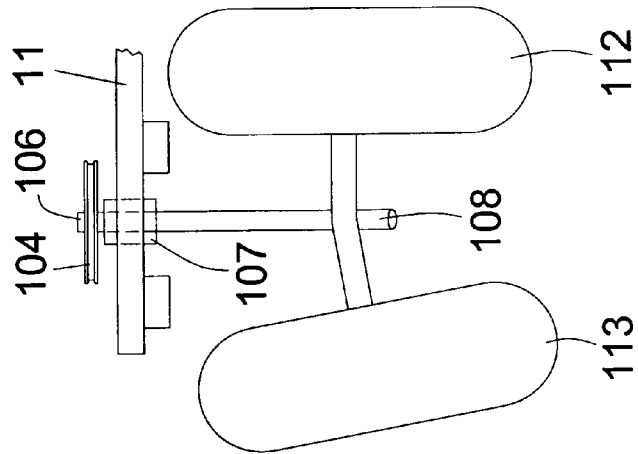
FIG. 5 is a side elevation view of the rear caster when the steering wheel has been turned 90 degrees.
Figure 4:
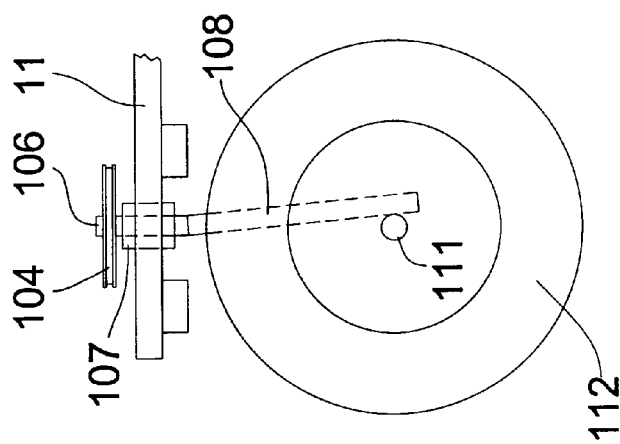
FIG. 4 is a side elevation of the rear caster.
Figure 3:
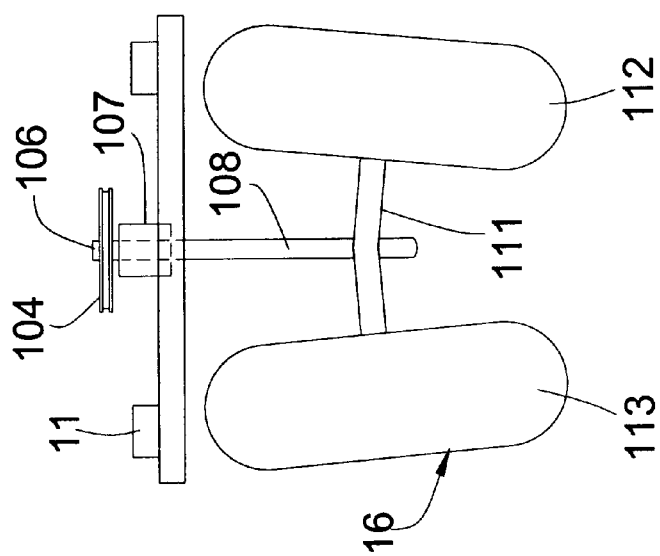
FIG. 3 is a rear elevational view of the rear caster.
Figure 9:
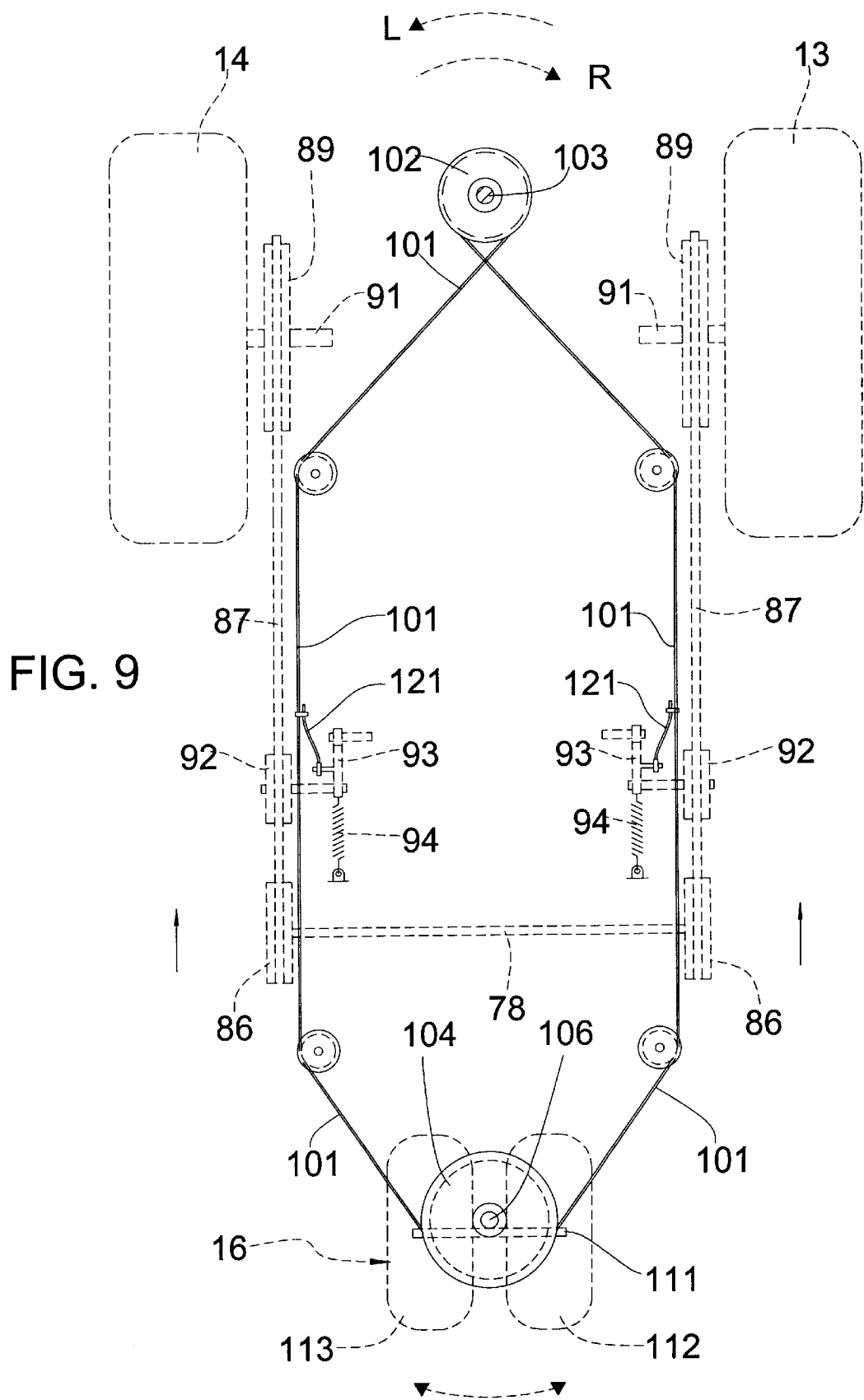
FIG. 9 is a plan view of the pigtail wheel drive control.

Referring to FIGS. 2 to 5, it may be seen that rear caster assembly 16 forms part of the zero radius steering mechanism. A cable 101 is entrained about a steering pulley 102 at the base of a steering column 103 supporting steering wheel 17 forming a Figure eight configuration by passing about a caster pulley 104. Caster pulley 104 is mounted at the top of a caster shaft 106 which extends through frame 11 and is mounted for vertical rotation in an appropriate bearing 107 affixed to chassis 11. Caster shaft 106 has an offset portion 108 beneath chassis, which is angled relative to vertical toward the front of the mower. Mounted to the rear of offset portion 108 is a transverse caster axle 111 which is a negative dihedral angle in that it extends downwardly and outwardly from the point of attachment to the offset portion 108. Mounted on each side of offset portion 108 for rotation about the axle 111 are a pair of caster wheels 112, 113. As may be seen in FIGS. 3 and 4, when the mower is moving in a linear direction both caster wheels 112, 113 are engaged with the ground, however, when the mower is turning as shown in FIG. 5, the effect of the offset portion 108 and the negative dihedral axle 111 is to lift the forwardmost wheel off the ground such that there is no "scrubbing" of the wheels due to the different turning radius of the caster wheels. This is significant because, as seen in FIGS. 6 and 9, during a zero radius turn, the wheel idler pulley 92 associated with wheel 13 or 14 on the inside of the turn is moved against the spring tension to a non-tensioning position such that the radius of the turn would impact both caster wheels 112, 113 if they both remained on the ground.

Two embodiments are disclosed for controlling the wheel idler pulley in a turn. In FIG. 6, a rigid link or rod 116 is affixed at one end to the arm 93 supporting wheel idler pulley 92 and at the other end to a pivot post 117 pivotally mounted to chassis 11. A camming head 118 is affixed to caster pulley 104 and extends outwardly therefrom along a line parallel to the tangent of pulley 104 transverse to chassis 11 an appropriate distance such that rotation of the pulley 104 in either direction brings the camming head into contact with the pivot post on the inside of the turn, thereby urging rod 1 16 forwardly and disengaging wheel idler pulley 92 for the inside drive wheel associated therewith. Referring to FIG. 9, cable 101 passes along either side of chassis 11 parallel and proximal the plane of wheel belt 87. A flexible connector or pigtail 121 is connected to cable 101 at a point adjacent and forward of idler pulley 92 with an end thereof connected to arm 93. Due to the Figure eight arrangement of the cable about the pulleys 102 and 104 the portion of cable 101 adjacent the inside wheel in a turn moves forwardly such that as the rotation of the steering wheel 17 tends toward a minimum radius turn, pigtail 121 pulls arm 93 against into a disengaged position and thereby remove drive power from the inside wheel.

From the foregoing it may be seen that the improved lawnmower described is a user-friendly and highly efficient apparatus. It is anticipated that the engine will be provided with an electric starter such that the operator may sit comfortably on the seat and start the mower. The brake pedal 133 prevents unexpected motion at startup. The operator engages the mower blades with lever 58 and depresses pedal 133 to release the brake and start the mower on its path. Speed and forward or reverse direction are controlled by pedal 83 controlled by the left foot. In essence, the pedals correlate to the gas pedal at the right foot of an automobile driver, and the clutch pedal at the left foot. However, fully depressing the left pedal will allow the mower to move in reverse, and releasing both pedals will cause the mower to stop. By manipulation of the pedals speed and direction can be accurately controlled, and with the steering mechanisms and shape of the mower deck close trimming is possible as with no prior known mower.

While the foregoing description and Figures relate to various embodiments of the invention, it is to be understood that the scope of the invention is not to be so limited but is to be determined by the scope of the appended claims.

What I claim is:

1. In a power-driven lawnmower having a main chassis supporting an operator, a pair of forward drive wheels, and a steering wheel, the combination therewith comprising:

a) A floating mower deck housing at least one driven mower blade, connected to said main chassis by a pair of arms terminating in ball joints affixed to said mower deck, and supported on ground engaging wheels such that the mower deck follows the contour of the ground and having a flexible blade drive belt connected to a drive element on said main chassis at a constant distance from said mower deck;

b) zero turning radius rear steering means operatively connected to said steering wheel and to means for disengaging one of said pair of forward drive wheels from motive power during a turn;

c) means for reversing operatively engaged to reverse the direction of travel of said power-driven lawnmower;

d) means for providing motive power to said lawnmower including an engine having an output shaft driven a variable rate of speed with an associated clutch mechanism; means for connecting said output shaft to said flexible drive belt; said means for reversing connecting said output shaft to a directional drive shaft for transferring motive, force to said forward wheels, and means for independently driving each of said forward wheels connected to said directional shaft; and, e) gravity actuated brake means for braking said mower comprising brake drum mounted to said directional drive shaft for concomitant rotation therewith; a brake shoe having a surface adapted for engagement with a peripheral surface of said brake drum to prevent rotation thereof; a linkage connecting said brake shoe to a pedal for said operator comprising a brake lever mounted for pivotal motion about in axis parallel to said directional drive shaft and having a first portion extending upwardly to define said pedal and a second portion extending outwardly and rearwardly toward said brake drum to support a shoe link pivotally supporting said brake shoe such that depressing said pedal causes said brake shoe to lift from said brake drum and that releasing said pedal causes said shoe link and said brake shoe to fall by gravity to a brake engaging position in which said directional drive shaft is held arrested from rotation in either direction.

2. A lawnmower as defined in claim 1 further comprising at least two sheaves affixed to said output shaft for concomitant rotation thereon wherein said means for reversing comprises a drive belt engaged with one of said at least two sheaves, an auxiliary shaft having a first pulley affixed thereto and engaged with said drive belt, said auxiliary shaft being mounted for selective movement relative to said output shaft and said directional drive shaft, a second pulley affixed to said auxiliary shaft and having an auxiliary belt entrained thereon and entrained about a drive pulley affixed to said directional drive shaft for concomitant rotation therewith; a drive wheel coaxially mounted for concomitant motion with said directional drive shaft, a reversing wheel coaxially mounted to said auxiliary shaft for concomitant rotation therewith; means for tensioning said drive belt such that said drive belt is substantially constantly engaged within said one sheave and said first pulley for transferring forces therebetween; means for selectively positioning said auxiliary shaft at a forward position wherein said auxiliary belt is engaged by said second pulley and said drive pulley to transfer rotative force thereto from said motor for rotating said directional drive shaft in a first angular direction with said reversing wheel displaced from said drive wheel, a neutral position wherein said drive wheel is displaced from said drive wheel and said auxiliary belt is disengaged from said drive pulley, and a reverse position wherein said drive wheel is engaged with said reversing wheel for rotating said directional drive shaft in a second angular direction and said auxiliary belt is disengaged from said drive pulley.

3. A lawnmower as defined in claim 2 wherein said means for connecting comprises a power take off shaft having a driver pulley engaged by a power take off belt entrained within said second of said at least one of two sheaves and a tensioning idler selectively movable between a powered tensioned position and an unpowered slack position and a power take off pulley affixed to said power take off shaft for concomitant motion, said power take off pulley being centered on said chassis, with said shaft being parallel to a blade drive shaft on said mower deck.

4. A lawnmower as defined in claim 1 further comprising at least two sheaves affixed to said output shaft for concomitant rotation thereon wherein said means for connecting comprises a power take off shaft having a driver pulley engaged by a power take off belt entrained within said second of said at least one of two sheaves affixed to said output shaft and a tensioning idler selectively movable between a powered tensioned position and an unpowered slack position and a power take off pulley affixed to said power take off shaft for concomitant motion, said power take off pulley being centered on said power take off shaft, with said power take off shaft being parallel to a blade drive shaft on said mower deck.

5. A lawnmower as defined in claim 4 wherein said pair of arms extend from independent pivotal mountings on said chassis coaxially aligned with said power take off shaft, and said drive element is a mower pulley mounted for concomitant rotation on said blade drive shaft at a central location such that said power take off pulley and said mower pulley remain substantially constantly spaced irrespective of the inclination of said arms.

6. A lawnmower as defined in claim 5 wherein said pair of arms are adjustable in length.

7. A lawnmower as defined in claim 1 wherein said pair of arms extend from independent pivotal mountings on said chassis coaxially aligned with a power take off shaft rotatably mounted to said chassis and supporting for concomitant rotation thereon a power take off pulley, and said drive element is a mower pulley mounted for concomitant rotation at a central location on a blade drive shaft mounted atop said mower deck such that said power take off pulley and said mower pulley remain substantially constantly spaced irrespective of the inclination of said arms.

8. A lawnmower as defined in claim 1 further wherein said means for reversing comprises a drive belt engaged with a means for providing motive force to said lawnmower mounted on said chassis; a directional drive shaft for transferring motive force to said forward wheels; an auxiliary shaft having a first pulley affixed to said auxiliary shaft and engaged with said drive belt, said auxiliary shaft being mounted for selective movement relative to said drive shaft, a second pulley affixed to said auxiliary shaft and having an auxiliary belt entrained thereon and entrained about a drive pulley affixed to said directional drive shaft for concomitant rotation therewith; a drive wheel coaxially mounted for concomitant motion with said directional drive shaft, a reversing wheel coaxially mounted to said auxiliary shaft for concomitant rotation therewith; means for tensioning said drive belt such that said drive belt is substantially constantly engaged within said first pulley for transferring forces therebetween; means for selectively positioning said auxiliary shaft at a forward position wherein said auxiliary belt is engaged by said second pulley and said drive pulley to transfer rotative force thereto from said motor for rotating said directional drive shaft in a first angular direction with said reversing wheel is displaced from said drive wheel, a neutral position wherein said driver wheel is displaced from said drive wheel and said auxiliary belt is disengaged from said drive pulley, and a reverse position wherein said drive wheel is engaged with said reversing wheel for rotating said directional drive shaft in a second angular direction and said auxiliary belt is disengaged from said drive pulley.

9. A lawnmower as defined in claim 1 wherein said zero turning radius steering means comprises a rear support element rotatable about a vertical axis and connected to said steering wheel for directional guidance of said lawnmower and connected to said means for selectively disengaging said one of said drive wheels responsive to the direction of a turn.

10. A lawnmower as defined in claim 9 wherein said rear support element is connected to said steering wheel by a cable extending along each side of said chassis.

11. A lawnmower as defined in claim 10 further comprising means for providing motive power to said lawnmower including an engine having an output shaft driven a variable rate of speed; means for connecting said output shaft to a drive shaft for transferring motive force to said forward wheels, responsive to said reversing means; and means for independently driving each of said forward wheels connected to said drive shaft.

12. A lawnmower as defined in claim 11 wherein said means for independently driving each of said forward wheels comprises a wheel belt associated with each wheel and entrained about a drive pulley on each end of said drive shaft and a wheel pulley mounted on a stub shaft connected to one of said wheels for concomitant motion therewith, and means for selectively tensioning said wheel belt for selectively transferring motive force from said drive shaft.

13. A lawnmower as defined in claim 12 wherein said means for selectively tensioning comprises a wheel idler pulley pivotally mounted for selective movement to tensioning position and a slack position.

14. A lawnmower as defined in claim 13 wherein said means for disengaging comprises a spring biasing said wheel idler pulley into said tensioning position and a connector affixed to said cable and said wheel idler pulley such that movement of said cable to turn said rear support element concomitantly moves said wheel idler pulley into said slack position.

15. A lawnmower as defined in claim 13 wherein said means for disengaging comprises a rigid link articulately affixed to said rear support element and said wheel idler pulley to move said wheel idler pulley responsive to movement of said rear support element.

16. A lawnmower as defined in claim 9 wherein said rear support element comprises a vertical shaft mounted for rotation about its axis responsive to said steering wheel, a lower portion of said shaft offset at an angle from vertical, a transverse axle mounted to said lower portion on the axis of said vertical shaft and extending outwardly and downwardly therefrom, and a pair of guide wheels rotabably mounted on said axle on either side of said lower portion.

* * * * *